May 3, 1932.  L. M. MERCIER  1,857,062
PRESSURE INDICATING INFLATOR
Filed Nov. 11, 1930
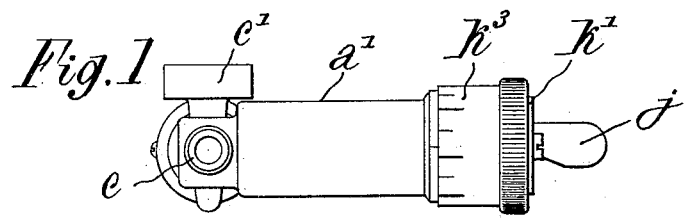
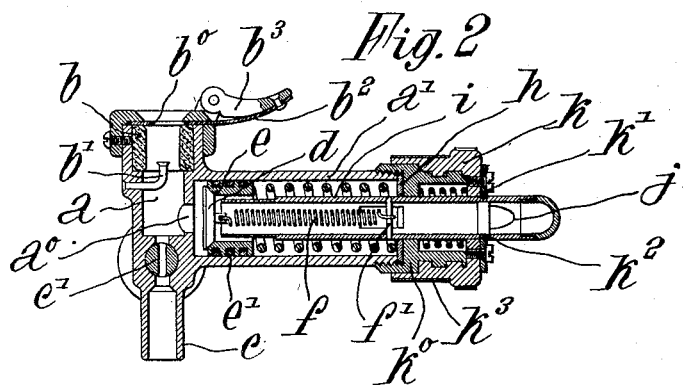
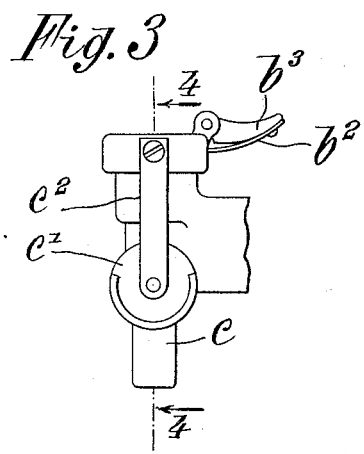
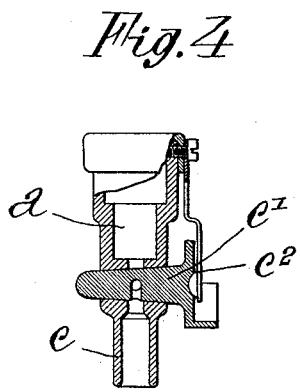
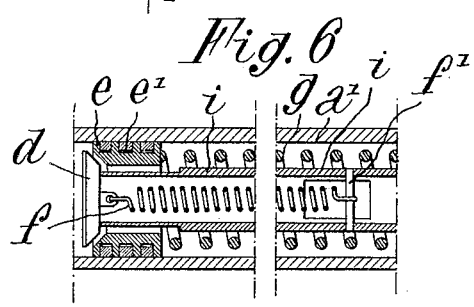
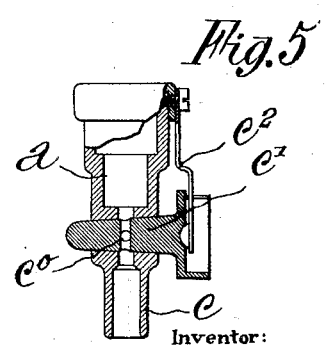
Inventor:
Louis Marcel Mercier
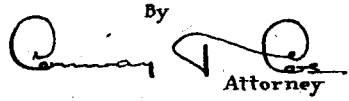
Attorney Patented May 3, 1932

1,857,062

UNITED STATES PATENT OFFICE

LOUIS MARCEL MERCIER, OF NEUILLY SUR SEINE, FRANCE

PRESSURE INDICATING INFLATOR

Application filed November 11, 1930, Serial No. 494,984, and in Belgium November 22, 1929.

The present invention relates to pressure indicating inflators and, more particularly, to those of the type designed to be used for inflating automobile tyres.

One of the objects of the invention is to provide signalling means operative to indicate that a predetermined pressure has been reached.

Another object is to provide a device capable of being used with automobile tyres and operative either to indicate that a predetermined pressure has been reached or to diminish the pressure in the tyre to a predetermined value.

Further objects will appear in the course of the detailed description now to be given with reference to the accompanying drawings, in which:

Figure 1 is a plan of one illustrative embodiment of the invention;

Figure 2 is an axial section through the device represented in Figure 1;

Figure 3 is a side-view of the structures shown in Figures 1 and 2;

Figure 4 represents in partial section the valve assembly;

Figure 5 is a similar view of the valve assembly in another position of operation;

Figure 6 is an enlarged sectional view of the pressure relief valve.

Referring to the various figures of the drawings, there is shown an assembly composed of the following elements; a pressure chamber $a$ terminating at one extremity in a yieldable nozzle $b$ and at the other extremity in a tube or conduit $c$ adapted to be connected to a source of fluid pressure, communication between $a$ and $c$ being controlled by a three-way valve $c^1$ provided with a passage $c^0$ communicating with the atmosphere (Figure 5); an abutment $b^1$ positioned in chamber $a$ and adapted to open the valve stem of the tyre: an assembly adapted to grip the threaded portions of the tyre valve consisting of a flexible element $b^2$ provided with an opening $b^0$ and a lever $b^3$ supporting $b^2$; and a pressure sensitive signalling system consisting of a tube $a^1$ integral with the walls of chamber $a$ and closed at one end by a washer $h$, a piston $e$ provided with packing rings $e^1$ and slidably mounted in tube $a^1$ a spring $g$, tending to move piston $e$ towards $a$, a bevelled valve $d$ suspended by a spring $f$ from a transverse pin $f^1$, the latter being supported on a hollow tube $i$ extending axially into tube $a^1$ and piston $e$, a whistle $j$ of any convenient design forming part of. or built into, tube $i$, a head element $k^0$ threadedly engaging at one end of tube $a^1$ and having a thread formed on the outer surface thereof, an internally threaded head $k$ coacting with the treaded portion of $k^0$ and fitted with a plate $k^1$ extending into a recess $k^2$ formed in tube $i$, and graduations $k^3$ on the outer surfaces of elements $k$ and $k^0$ adapted to indicate the pressure desired.

The hereinabove described assembly operates in the following manner: Nozzle $b$ is forced over the tyre valve so as to contact intimately therewith, the edges of opening $b^0$ gripping the threaded portions of the tyre valve and maintaining the apparatus in place; valve $c^1$ is then turned into the position shown in Figure 2 and compressed air is permitted to flow into the tyre; when a sufficient pressure has been built up in the chamber $a$, pressure exterted via passages $a^0$ on piston $e$, forces the latter toward the right against the action of spring $g$; valve $d$ follows the movement of piston $e$ under the action of spring $f$, but when elements $d$ and $e$ have moved sufficiently far to the right to bring valve $d$ into contact with the end of tube $i$, valve $d$ will be held in position while piston $e$ continues to move; air will then escape between the peripheral edges of valve $d$ and the corresponding valve seating surface of piston $e$ and will sound whistle $j$; the valve $c^1$ may then be turned into closed position and the entire assembly may be removed from the tyre valve by exerting pressure on lever $b^3$ so as to disengage flexible element $b^2$ therefrom.

Valve $d$ may be set to release air at any predetermined pressure by rotating head $k$ so that graduations $k^3$ indicate the pressure desired. By referring to Figure 2, it will be seen that plate $k^1$ engaging in recess $k^2$ of tube $i$ will cause the latter to follow the outward and inward movement of head $k$ when the latter is rotated on $k^0$.

If it be desired to utilize the device for measuring the pressure inside a tyre, valve $c^1$ is turned into closed position and the tube $i$ having been moved as far to the right as possible by rotation of head $k$, the latter is gradually turned so as to move tube $i$ to the left; as soon as tube $i$ abuts against valve $d$, air will escape between elements $d$ and $e$ and will sound whistle $j$; a reading of graduations $k^3$ will then give the pressure.

If during the use of the apparatus it be desired to release pressure into the atmosphere from chamber $a$ or from the tyre, valve $c^1$ is turned into the position shown in Figure 5 so as to bring chamber $a$ into communication with the atmosphere, finger $c^2$ coacting with a properly positioned abutment serving to indicate when passage $c^0$ is in communication with the atmosphere.

What I claim is:—

1. A pressure indicating assembly comprising a chamber provided with an opening adapted to be connected to a source of fluid pressure, a piston responsive to pressure variations in said chamber, said piston having an opening therein, a valve mounted in said opening, and means operative to open said valve when the pressure in said chamber reaches a predetermined value.

2. A pressure indicating device comprising in combination a chamber provided with an opening adapted to be connected to a source of fluid pressure, a piston responsive to changes in pressure inside said chamber, said piston having an opening therein, a valve mounted in said opening, and an abutment mounted to contact with said valve when the pressure in said chamber reaches a predetermined value, whereby said valve will no longer be able to follow the movements of said piston.

3. A pressure indicating assembly comprising in combination a chamber provided with an opening adapted to be connected to a source of fluid pressure, a piston mounted to respond to changes in pressure inside said chamber, said piston having an opening therein, a valve mounted in said opening, an abutment mounted to limit the movement of said valve, and means for adjusting the position of said abutment.

4. A structure as defined in claim 3 in combination with a whistle mounted to receive fluid escaping past said valve.

5. A pressure indicating assembly comprising in combination a pressure chamber provided with an opening adapted to be connected to a source of fluid pressure, a piston mounted to respond to changes of pressure inside said pressure chamber, said piston having an opening therein, a valve mounted in said opening, a spring mounted to oppose movement of said piston under the action of increasing pressures inside the pressure chamber, spring means tending to maintain said valve in contact with said piston, and an abutment mounted in line with said valve and in the direction of movement of said piston, whereby under the action of increasing pressures, said piston is free to move, whereas said valve is prevented by said abutment from moving.

6. A pressure indicating assembly comprising a pressure chamber provided with an opening adapted to be connected to a source of fluid pressure, a piston responsive to changes in pressure inside said pressure chamber, said piston having an opening therein, a valve mounted in said opening, spring means tending to maintain said valve in contact with said piston, a spring tending to force said piston toward the pressure chamber, a tube positioned in alignment with said valve, said tube functioning as an abutment for limiting the movement of said valve with said piston, and means for varying the relative position of said tube and said valve.

7. A structure as defined in claim 6 in combination with signalling means responsive to the movement of air through said tube.

8. A structure as defined in claim 6 in combination with acoustic means operative to sound when air passes said valve and enters said tube.

9. A structure as defined in claim 6 in combination with a conduit adapted to be connected to a source of fluid pressure, and a three-way valve interposed between said conduit and said pressure chamber, said three-way valve being operative to place said pressure chamber in communication with either said conduit or the atmosphere.

10. A pressure indicating assembly comprising a chamber adapted to be connected to a source of pressure to be measured, a whistle, means operative to establish connection between said whistle and said chamber when the pressure in the latter reaches a predetermined value, a conduit, and a valve interposed between said conduit and said chamber, said valve being operative to control communication between the conduit and the chamber.

In testimony whereof I affix my signature.

LOUIS MARCEL MERCIER.